United States Patent
Asai et al.

(10) Patent No.: US 6,629,697 B1
(45) Date of Patent: Oct. 7, 2003

(54) CHUCK APPARATUS

(75) Inventors: Koichi Asai, Chiryu (JP); Yasumoto Shioya, Takahama (JP); Kazuo Amano, Okazaki (JP); Nobuyuki Teshi, Okazaki (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 131 days.

(21) Appl. No.: 09/716,413

(22) Filed: Nov. 21, 2000

(30) Foreign Application Priority Data

Dec. 17, 1999 (JP) .......................................... 11-358997

(51) Int. Cl.⁷ ............................................. B23B 31/26
(52) U.S. Cl. ...................................... 279/134; 279/110
(58) Field of Search ................................. 279/134, 135, 279/50, 51, 110; 82/142, 147

(56) References Cited

U.S. PATENT DOCUMENTS

| | | | | |
|---|---|---|---|---|
| 1,848,317 A | * | 3/1932 | Church | 279/134 |
| 1,967,045 A | * | 7/1934 | Wehmeyer | 279/134 |
| 2,006,621 A | * | 7/1935 | Berg | 279/135 |
| 2,471,863 A | * | 5/1949 | Church | 279/134 |
| 3,512,792 A | * | 5/1970 | Farley et al. | 279/51 |
| 3,612,384 A | * | 10/1971 | Loyd et al. | 279/51 |
| 3,936,060 A | * | 2/1976 | Hirao | 279/110 |
| 4,133,230 A | * | 1/1979 | Inaba et al. | 82/142 |
| 4,567,794 A | | 2/1986 | Bald | |
| 4,750,850 A | | 6/1988 | Husted | |
| 4,758,006 A | * | 7/1988 | Hiestand | 279/135 |
| 4,951,535 A | * | 8/1990 | Hiestand | 82/142 |
| 5,088,362 A | * | 2/1992 | Schalles | 82/142 |
| 5,664,916 A | * | 9/1997 | Link et al. | 82/142 |
| 6,139,028 A | * | 10/2000 | Kosho | 82/142 |

FOREIGN PATENT DOCUMENTS

| | | | | |
|---|---|---|---|---|
| EP | 0 925 862 A1 | | 6/1999 | |
| GB | 383162 | | 11/1932 | |
| GB | 2067931 A1 | * | 8/1981 | 279/135 |
| GB | 2068272 A1 | * | 8/1981 | 279/134 |
| JP | 01234105 A | * | 9/1989 | 279/134 |
| JP | 10133723 A | * | 5/1998 | B23Q/5/22 |
| JP | 10138021 A | * | 5/1998 | B23B/31/20 |

* cited by examiner

Primary Examiner—Daniel W. Howell
(74) Attorney, Agent, or Firm—Oliff & Berridge, PLC

(57) ABSTRACT

A chuck apparatus including a chuck, and a power-driven device which selectively places the chuck in an object-hold state thereof in which the chuck holds an object, and an object-release state thereof in which the chuck releases the object, the power-driven device including, as a power source thereof, an electric motor.

12 Claims, 4 Drawing Sheets

CHUCK APPARATUS

BACKGROUND OF THE INVENTION

1. Field of the Invention

The present invention relates to a chuck apparatus which is employed in a working machine such as a spinning machine and which holds a workpiece or a working tool.

2. Discussion of Related Art

There is known a chuck which is attached to a spindle or a main shaft of, e.g., a working lathe or an external cylindrical grinding machine to hold a workpiece, or a main shaft of, e.g., a milling machine or a drilling machine to hold a working tool. Though there are known various sorts of chucks, two sorts of chucks are particularly known in the art, i.e., (a) a three-jaw chuck which includes a main member and three holding jaws which are movable in respective radial directions of the main member, and (b) a collet chuck which includes a collet having a generally tubular shape, having a plurality of expanding slots extending in an axial direction thereof, and having one of an outer tapered surface and an inner tapered surface and additionally includes a main member having one of an inner tapered surface and an outer tapered surface that corresponds to the one tapered surface of the collet.

A conventional chuck apparatus includes, in addition to a chuck, a state switching device which selectively switches the chuck to a work-hold state in which the chuck holds a work and a work-release state in which the chuck releases the work. As the state switching device, there are known a manually operable one and a power-driven one. In the case where the chuck is not a rotary one, the state switching device used with the chuck may be of a more or less large size. However, in the case where the chuck is a rotary one that is attached to a main shaft and is rotated with the main shaft, there is a strong need to reduce the size of the chuck apparatus. In particular, the power-driven state-switching device is likely to have a large size, which results in various sorts of disadvantages. For example, if the chuck apparatus which is rotated with the main shaft has a large size, then the apparatus has a great moment of inertia, which makes it difficult to start and stop quickly the rotation of the main shaft and thereby makes it difficult to improve the working efficiency of the working machine. In addition, it is difficult for the working machine to secure a space sufficient to accommodate the large-size chuck apparatus. This problem becomes more serious in the case where a working machine as a whole is of a considerably small size or a single working machine employs a plurality of spindles or main shafts each of which is associated with a chuck apparatus.

Meanwhile, in the case where the state switching device is a power-driven one, it has been conventional that the power-driven state-switching device employs, as a power source thereof, a hydraulically-operated cylinder device. However, the hydraulic cylinder device has a problem that the operation of the cylinder device cannot be finely controlled, in particular, the operation stroke thereof cannot be accurately controlled. In addition, the working machine which employs the chuck apparatus needs to employ a stand which produces a hydraulic pressure. Thus, the size and cost of the working machine are increased. Moreover, since the hydraulic-pressure stand needs to be continuously operated during the operation of the working machine, the energy efficiency of the machine is decreased.

SUMMARY OF THE INVENTION

The present invention provides a chuck apparatus and a working machine which have one or more of the following technical features that are described below in respective paragraphs given parenthesized sequential numbers (1) to (18). Any technical feature that includes another technical feature shall do so by referring, at the beginning, to the parenthesized sequential number given to the latter feature. However, the following technical features and the appropriate combinations thereof are just examples to which the scope of the present invention is by no means limited. In addition, in the case where one technical feature recites a plurality of items, it is not essentially required that all of those items be simultaneously employed. That is, it is possible to select and employ only a portion (one, two, ..., but not all) of those items.

(1) According to a first feature of the present invention, there is provided a chuck apparatus comprising a chuck; and a power-driven device which selectively places the chuck in an object-hold state thereof in which the chuck holds an object, and an object-release state thereof in which the chuck releases the object, the power-driven device comprising, as a power source thereof, an electric motor.

Since the power-driven device which selectively places the chuck in the object-hold state and the object-release state includes, as the power source, the electric motor, the present chuck apparatus is free of the above-identified problems and/or disadvantages of the conventional chuck apparatus in which the power-driven device includes, as the power source, the hydraulic cylinder device.

(2) According to a second feature of the present invention that includes the first feature (1), the electric motor comprises a servomotor.

Since the servomotor as the electric motor can be accurately controlled with respect to its rotation angle, torque, rotation speed, etc, an operation amount, and an operation force, of the chuck apparatus can be finely controlled.

(3) According to a third feature of the present invention that includes the first or second feature (1) or (2), the chuck comprises at least one holding member at least a portion of which is moved in a radial direction thereof so as to be selectively placed in the object-hold state and the object-release state, the power-driven device further comprises an axial-direction movable member which is movable in an axial direction of the chuck; and a first motion converting device which converts the axial-direction motion of the movable member into the radial-direction motion of at least the portion of the holding member, and the electric motor causes the axial-direction motion of the movable member.

(4) According to a fourth feature of the present invention that includes the third feature (3), the axial-direction movable member comprises a draw bar which transmits a tensile force to the chuck and thereby places the chuck in the object-hold state.

Since the chuck apparatus employs the draw bar, it is made possible to attach the chuck to a front end of a rotary shaft, such as a spindle, and provide the power source of the power-driven device around a rear end of the rotary shaft. Thus, it is made easier to dispose the power-driven device as a whole or the power source thereof. Since a tool rest or a work rest which is moved while holding a tool or a work is provided around the chuck, it is difficult, in many cases, to dispose the power-driven device around the chuck. However, the present chuck apparatus is free of that problem.

(5) According to a fifth feature of the present invention that includes the third or fourth feature (3) or (4), the power-driven device further comprises a first rotary member which is rotatable about an axis line of the axial-direction movable member and whose axial-direction movement is restricted; and a second motion converting device which converts the rotary motion of the first rotary member into the axial-direction motion of the movable member, and the electric motor rotates the first rotary member.

In the present chuck apparatus, since the rotation of the first rotary member causes the axial-direction movement of the axial-direction movable member, the rotary-type electric motor can be easily employed as the power source of the power-driven device.

(6) According to a sixth feature of the present invention that includes the fifth feature (5), the second motion converting device comprises a first threaded member which is substantially integral with the axial-direction movable member and a second threaded member which is threadedly engaged with the first threaded member, and the second threaded member is substantially integral with the first rotary member. The phrase "substantially integral" means either the first or second threaded member is literally integral with the axial-direction movable member or the first rotary member, or that the former member is fixed to the latter member such that the two members are not movable or rotatable relative to each other.

Since the second motion converting device includes the first and second threaded members which are threadedly engaged with each other, the construction of the present chuck apparatus can be easily simplified.

(7) According to a seventh feature of the present invention that includes the fifth or sixth feature (5) or (6), the power-driven device further comprises a clutch which is provided between the electric motor and the first rotary member and which is selectively placed in a connected state thereof in which the clutch connects the first rotary member and the electric motor to each other and a disconnected state thereof in which the clutch disconnects the first rotary member and the electric motor from each other, the clutch being usually kept in the disconnected state, and being placed in the connected state when the chuck is switched between the object-hold state and the object-release state.

Though the chuck is of a type which is rotated with the rotary shaft, at least the power source of the power-driven device can be disconnected from the chuck, by placing the clutch in the disconnected state. Thus, the power source need not be rotated with the rotary shaft. This feature contributes to increasing the degree of freedom with respect to the position where the electric motor is disposed, or reducing the moment of inertia exerted to the chuck and a portion of the power-driven device that is rotated with the rotary shaft. However, it is noted that the seventh feature (7) may be employed in a chuck apparatus which employs a hydraulic oscillating motor as the power source of the power-driven device.

(8) According to an eighth feature of the present invention that includes any one of the fifth to seventh features (5) to (7), the power-driven device further comprises at least one elastic member which applies an elastic force to the first rotary member in a direction in which the chuck is biased toward the object-hold state via the axial-direction movable member and the second motion converting device.

When the elastic force of the elastic member is applied to the first rotary member, the elastic force is transmitted to the axial-direction movable member via the first rotary member and the second motion converting mechanism, so that the chuck is stably kept in the work-hold state. This feature is particularly advantageous in the case where a clutch is provided between the electric motor and the first rotary member and the clutch is placed in its disconnected state during the rotation of the rotary shaft.

(9) According to a ninth feature of the present invention that includes any one of the third to eighth features (3) to (8), the chuck comprises a main member and three holding members which are supported by the main member such that the holding members are movable in respective radial directions of the main member, and the first motion converting device converts the axial-direction motion of the movable member into respective radial-direction motions of the three holding members that are axis-symmetric with one another with respect to an axis line of the main member.

The holding members may be ones which cooperate with one another to engage an outer circumferential surface of an object and thereby hold the object, or ones which cooperate with one another to engage an inner circumferential surface of an object and thereby hold the object.

(10) According to a tenth feature of the present invention that includes any one of the third to eighth features (3) to (8), the holding member comprises a collet which has a tubular shape and has a plurality of slots extending in the axial direction of the chuck, and the first motion converting device comprises one of an outer tapered surface and an inner tapered surface that is provided on the collet; and a main member which has the other of the inner tapered surface and the outer tapered surface.

The collet may be one which engages an outer circumferential surface of an object and thereby hold the object, or one which engages an inner circumferential surface of an object and thereby hold the object.

(11) According to an eleventh feature of the present invention that includes any one of the first to tenth features (1) to (10), the chuck comprises a main member which is attached to an end of a rotary shaft so as to be rotated with the rotary shaft.

(12) According to a twelfth feature of the present invention that includes the eleventh feature (11), the electric motor is attached to a frame which supports the rotary shaft such that the rotary shaft is rotatable about an axis line thereof.

(13) According to a thirteenth feature of the present invention that includes the eleventh or twelfth feature (11) or (12), the chuck apparatus further comprises a main drive device which rotates the rotary shaft.

(14) According to a fourteenth feature of the present invention that includes the thirteenth feature (13), the main drive device comprises a second electric motor which is different from the electric motor of the power-driven device as a first electric motor and which includes a stator fixed to the frame; and a rotor which is provided inside the stator such that the rotor is coaxial with the stator and which is fixed to the rotary shaft so as to be rotated with the rotary shaft.

Since the rotation of the rotor is directly transmitted to the rotary shaft, it is possible to reduce the moment of inertia that is exerted to the chuck and a portion of the power-driven device that is rotated with the rotary shaft.

(15) According to a fifteenth feature of the present invention that includes the seventh feature (7), the clutch comprises a first clutch member which is fixedly provided on the first rotary member; and a second clutch member which is coaxial with the rotary shaft, is rotatable relative to the rotary shaft, and is movable relative to the rotary shaft in the axial direction of the chuck, and which is moved in the axial direction to be engaged with, and disengaged from, the first clutch member.

The present chuck apparatus can employ any one of the eighth to fourteenth features (8) to (14).

(16) According to a sixteenth feature of the present invention that includes the fifteenth feature (15), the chuck apparatus further comprises a frame; a rotary shaft which is supported by the frame such that the rotary shaft is rotatable about an axis line thereof; a main member which is attached to an end of the rotary shaft; a second rotary member which is supported by the frame such that the second rotary member is rotatable about an axis line thereof and which is engaged with the second clutch member such that the second rotary member is not rotatable relative to the second clutch member and is movable relative to the second clutch member in the axial direction of the chuck; and a rotation transmitting member which transmits the rotation of the electric motor to the second rotary member.

For example, the second rotary member is provided by a pulley, and the rotation transmitting member is provided by a wound-on member, such as a belt or a chain, that is wound on the pulley. Alternatively, the second rotary member may be provided by a first gear, and the rotation transmitting device may be provided by a second gear which is meshed with the first gear.

(17) According to a seventeenth feature of the present invention, there is provided a working machine comprising a frame; a rotary shaft which is supported by the frame such that the rotary shaft is rotatable about an axis line thereof relative to the frame; a rotor which is fixed to the rotary shaft; a stator which is provided outside the stator such that the stator is coaxial with the rotor and which is supported by the frame such that the stator is not rotatable relative to the frame; and a chuck which is provided at an end of the rotary shaft and which holds and releases an object.

The object may be either a workpiece or a working tool. In the case where the object is a workpiece, the present working machine further employs a too holding device which is not rotatable and which holds a working tool. On the other hand, in the case where the object is a working tool, the present working machine further employs a workpiece holding device which is not rotatable and which holds a workpiece. The present working machine may employ any one of the first to sixteenth features (1) to (16).

(18) According to an eighteenth feature of the present invention that includes the seventeenth feature (17), the working machine further comprises a state switching device which includes a power source and which selectively switches the chuck to an object-hold state thereof in which the chuck holds the object and an object-release state thereof in which the chuck releases the object, the power source is separate from the rotary shaft and is not rotatable relative to the frame.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Figure 1:
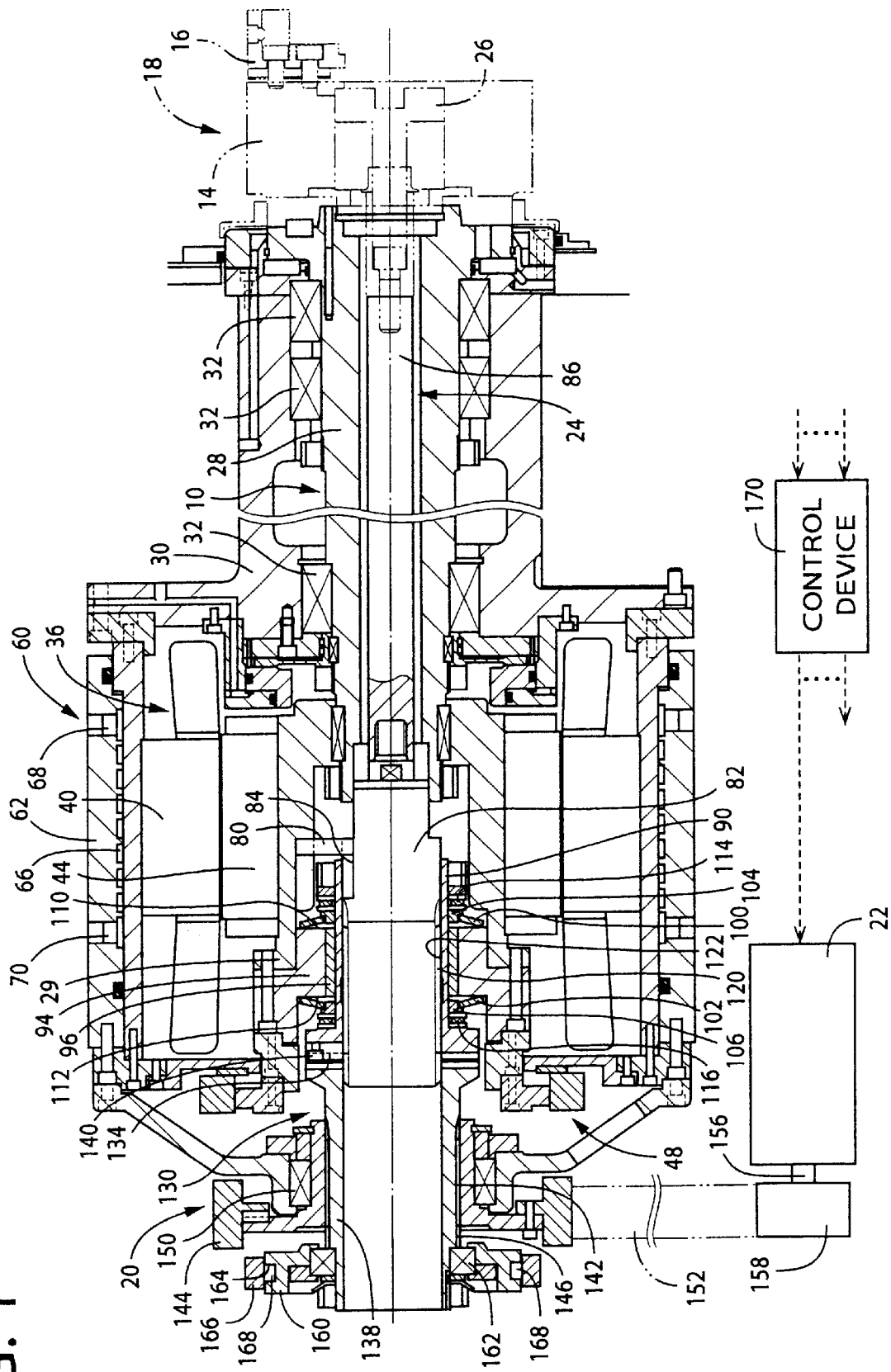
FIG. 1 is a cross-sectioned, front elevation view of a relevant portion of a working lathe including a chuck apparatus to which the present invention is applied.

Referring first to FIG. 1, there will be described in detail a chuck apparatus embodying the present invention.

FIG. 1 shows a relevant portion of a working lathe as a sort of working machine that includes a chuck apparatus embodying the present invention. The working lathe has a main shaft 10 as a rotary shaft that is rotatably supported by a frame 30 of the lathe. The chuck apparatus includes a chuck 18 including a main member 14 which is coaxially and detachably attached to the main shaft 10, and three holding jaws 16 (only one jaw 16 is shown in FIG. 1) as a plurality of holding members that are supported by the main member 14 such that the three jaws 16 are equiangularly spaced from one another about the main shaft 10 and are movable in respective radial directions of the same 10. The chuck apparatus additionally includes a power-driven device 20 which selectively places the three holding jaws 16 in a work-hold state in which the jaws 16 cooperate with one another to hold a work as a sort of object and in a work-release state in which the jaws 16 release the work. Thus, the present chuck apparatus employs the three-jaw chuck 18. The power-driven device 20 includes a servomotor 22 as a drive source. The holding jaws 16 are connected to a draw bar 24 as an axial-direction movable member, via a motion converting mechanism 26 as a first motion converting mechanism. The motion converting mechanism 26 converts a linear motion or movement of the draw bar 24 in an axial direction of the rotary shaft 10, into respective motions of the three holding jaws 16 that are axis-symmetric with one another with respect to an axis line of the main member 14 that is coaxial with the axis line of the shaft 10. The axis-symmetric motions of the three jaws 16 are respective movements of the same 16 toward, or away from, one another in respective radial directions of the shaft 10. Thus, the three jaws 16 are selectively placed in the work-hold state in which the jaws 16 contact an outer surface of the work and hold the same and in the work-release state in which the jaws 16 release the work. The axial-direction movement of the draw bar 24 is caused by the operation or rotation of the servomotor 22. Thus, in the present embodiment, the power-driven device 20 can be said as a state-switch device which switches the three holding jaws 16 from the work-hold state to the work-release state and vice versa and which includes the servomotor 22 as a power source. The detailed construction of the power-driven device 20 will be described later.

The chuck 18 holding the work is rotated with the main shaft 10. The main shaft 10 includes a plurality of members which are assembled into the integral member 10. The main shaft 10 has a hollow cylindrical shape including a small-diameter front portion 28 and a large-diameter rear portion 29 whose diameter is greater than that of the front portion 28. The front portion 28 of the main shaft 10 is rotatably received in a generally cylindrical hollow space formed in the frame 30 of the lathe, via a plurality of bearings 32. The frame 30 includes a plurality of members which are assembled into the integral member 30.

The main shaft 10 is driven or rotated by an electric motor 36 as a main drive device. In the present embodiment, the electric motor 36 is a synchronous-type electric motor which includes a stator 40 which is fixed to the frame 30; and a rotor 44 which is fixed to an outer circumferential surface of the rear portion 29 of the main shaft 10 such that the rotor 44 is located inside the stator 40 and is coaxial with, and adjacent to, the same 40. The rotor 44 is a permanent magnet. When the electric motor 36 is operated, the rotor 44 is rotated and accordingly the main shaft 10 is rotated. An amount of rotation of the electric motor 36 is detected by an encoder 48 which is provided at a rear end of the main shaft 10.

A cooling device 60 is provided outside the stator 40. In the present embodiment, the cooling device 60 is of a liquid-cooled type which includes a hollow, cylindrical jacket 62. The jacket 62 has a spiral liquid-flow passage 66 which opens in an inner circumferential surface thereof; and two openings 68, 70 each of which opens in an outer circumferential surface thereof and communicates with the passage 66. The jacket 62 is fluid-tightly fitted on an outer circumferential surface of a rear portion of the frame 30, and the stator 40 is fixed to an inner circumferential portion of the rear portion of the frame 30. One 68 (or 70) of the two openings 68, 70 functions as an inlet through which a coolant (i.e., a cooling liquid) is supplied, and the other opening 70 (or 68) functions as an outlet through which the coolant is discharged after passing through the passage 66. Thus, the heat produced by the operation of the electric motor 36 is removed.

The draw bar 24 is fitted in the main shaft 10 such that the bar 24 is coaxial with the shaft 10 and is movable in the axial direction of the same 10. A key 80 as a rotation-prevent member that is fixed to an inner circumferential surface of the rear portion 29 of the main shaft 10 with an appropriate fixing means such as a bolt, projects radially inward of the shaft 10 to be engaged with a key groove 84 which is formed in an outer circumferential surface of a rear portion 82 of the draw bar 24. Thus, the draw bar 24 is allowed to move relative to the main shaft 10 in the axial direction of the same 10, and is prevented from rotating relative to the same 10. The key 80 and the key groove 84 cooperate with each other to provide a rotation preventing device. The draw bar 24 includes two members corresponding to a front portion 86 and the rear portion 82, respectively, which are assembled with each other to provide the integral member 24. The rear portion 82 has a diameter greater than that of the front portion 86 that is connected to the motion converting mechanism 26.

A hollow, cylindrical rotary member 90 is provided outside the rear portion 82 of the draw bar 24. The rotary member 90 is supported by a holding portion 94 via a bearing metal 96 such that the rotary member 90 is rotatable about the axis line of the draw bar 24. The holding portion 94 projects radially inward from the rear portion 29 of the main shaft 10 and the bearing metal 96 is fixed to the holding portion 94. However, movements of the rotary member 90 in the axial-direction of the bar 24 are elastically restricted by a pair of disc springs 100, 102 which are retained by respective retainers 104, 106. The two disc springs 100, 102 apply respective elastic forces to the rotary member 90 in axially opposite directions, respectively. One disc spring 100 of the two disc springs 100, 102 is provided between the rotary member 90 and a front end surface 110 of the holding portion 94, and the other disc spring 102 is provided between the rotary member 90 and a rear end surface 112 of the holding portion 94. Two bearings 114, 116 are provided between the rotary member 90 and the two retainers 104, 106, respectively. Therefore, the rotation of the rotary member 90 is not transmitted to the disc springs 100, 102 or the main shaft 10.

The rear portion 82 of the draw bar 24 has, on an outer circumferential surface of a rear side of the key groove 84, an integrally formed, external thread 120 which is screwed in an internal thread 122 which is formed in an inner circumferential surface of the rotary member 90. The external thread 120 of the draw bar 24 provides a first screw member; the internal thread 122 of the rotary member 90 provides a second screw member; and the first and second screw members cooperate with each other to function as a second motion converting mechanism which converts the rotation of the rotary member 90 into the linear motion of the draw bar 24.

The rotary member 90 is driven or rotated by the above-mentioned servomotor 22. The rotary member 90 is connected to the servomotor 22 via a clutch 130, described later. The servomotor 22 is attached to the frame 30. In the present embodiment, the servomotor 22 is an AC (alternate current) servomotor that is an electric rotary motor as a sort of drive source and is accurately controllable with respect to its rotation angle and speed. An amount of rotation of the servomotor 22 is detected by an encoder (not shown).

The clutch 130 is a claw clutch including a first clutch member 134 which is integral with the rotary member 90; and a second clutch member 138 which is movable in the axial direction of the draw bar 24 and which includes an engaging portion which is engaged with, and disengaged from, an engaging portion of the first clutch member 134 when the second clutch member 138 is moved in the axial direction. In the present embodiment, the first clutch member 134 is fixed with a bolt 140 as a fixing means to a rear end surface of the rotary member 90. The second clutch member 138 has a hollow, cylindrical shape, is coaxial with the main shaft 10 (and the draw bar 24), and is rotatable relative to the same 10 (and the bar 24) and movable relative to the same 10 (and the bar 24) in the axial direction of same 10 (and the bar 24). The second clutch member 138 has an inner diameter which assures that the rear portion 82 of the draw bar 24 is fitable therein and move relative thereto in the axial direction thereof. The second clutch member 148 has, in an outer circumferential surface thereof, a spline portion 142, and fits in a spline hole 146 of a pulley 144 as a second rotary member such that the second clutch member 148 is not rotatable relative to the pulley 144 and is movable relative to the same 144 in the axial direction of the draw bar 24 (and the main shaft 10). The pulley 144 is supported by the frame 30 via a bearing 150, such that the pulley 144 is rotatable relative to the frame 30 and is not movable in the axial direction of the bar 24 (and the shaft 10). The pulley 144 is connected via an endless belt 152 to a pulley 158 fixed to an output shaft 156 of the servomotor 22.

An annular member 160 is attached via a bearing 162 to a rear end portion of the second clutch member 138 such that the annular member 160 is rotatable relative to the member 138 and is not movable relative to the same 138 in the axial direction of the same 138. The annular member 160 has, in an outer circumferential surface thereof, an annular groove 164, and a pair of pins 168 which project from one part-annular end portion of a lever 166 are engaged with the annular groove 164 such that the pins 168 are substantially not movable relative to the annular member 160 in the axial direction of the second clutch member 138. The lever 166 is supported by a support member (not shown) such that the lever 166 is pivotable about an axis line which is perpendicular to the axis line of the main shaft 10. The other end portion of the lever 166 is connected to an air-operated cylinder device (not shown) and, when the cylinder device is operated, the lever 166 is pivoted about its axis line perpendicular to the axis line of the shaft 10. This rotation of the lever 166 is transmitted to the annular member 160 because of the engagement of the pins 168 with the opposite side walls of the annular groove 164 of the annular member 160, so that the second clutch member 38 is moved in the axial direction to be engaged with, and disengaged from, the first clutch member 134. Thus, the clutch 130 is selectively placed in its connected state and its disconnected state. The air-operated cylinder device has a piston rod which is connected to the other end of the lever 166, and a solenoid-operated control valve (not shown) advances and retracts the piston rod of the cylinder device. The annular member 160, the lever 166, the pins 168 and the air-operated cylinder device cooperate with one another to provide a moving device which moves the second clutch member 138 relative to the first clutch member 134 in the axial direction of the draw bar 24 (or the main shaft 10). The lever 166 may be adapted such that the lever 166 is selectively placed in its connected and disconnected states on a manual-operation basis.

When the servomotor 22 is started with the clutch 130 being placed in its connected state, the rotation of the motor 22 is transmitted to the rotary member 90 via the pulley 158, belt 152, pulley 144, second clutch member 138, and first clutch member 134, and the rotary motion of the rotary member 90 is converted by the above-described second motion converting mechanism into the linear movement of the draw bar 24. Thus, the bar 24 is moved in the axial direction of the main shaft 10.

The present working lathe is controlled by a control device 170, which includes a computer including a processing unit (PU), a read only memory (ROM), a random access memory (RAM), an input interface, an output interface, etc.; and a plurality of drive circuits. The encoder 48 of the electric motor 36 and the encoder (not shown) of the servomotor 22 are connected to the input interface of the control device 170; and the output interface of the control device 170 is connected via the respective drive circuits to the servomotor 22, the electric motor 36 and the solenoid-operated control valve (not shown) associated with the clutch 130.

The presenting working lathe has the chuck apparatus constructed as described above. When the chuck 18 of the chuck apparatus holds a workpiece or work, first, the clutch 130 is placed in its connected state and then the servomotor 22 is started, so that the rotation of the second clutch member 138 is transmitted to the first clutch member 134 or the rotary member 90 and the draw bar 24 is moved rearward in the axial direction of the main shaft 10. This axial-direction movement of the draw bar 24 is converted by the motion converting mechanism 26 into the respective radial-direction movements of the three holding jaws 16, so that the three jaws 16 are moved toward one another and cooperate with one another to hold the work at an outer circumferential surface thereof.

Next, after the clutch 130 is placed in its disconnected state, the electric motor 36 is started. In the disconnected state of the clutch 130, the second clutch member 138 and the servomotor 22 are not connected to the first clutch member 134 and accordingly the main shaft 10. Therefore, when the electric motor 36 is operated and the main shaft 10 is rotated, the rotation of the shaft 10 is not transmitted to the second clutch member 138 or the servomotor 22. The rotation of the main shaft 10 causes the rotation of the work held by the chuck 18, and the work is cut by a cutting tool as a working tool that is attached to a tool holder (not shown). Even in the disconnected state of the clutch 130, the elastic force of the rear disc spring 102 is applied to the draw bar 24 via the rotary member 90 and the second motion converting mechanism (i.e., the internal and external threads 122, 120), so that the bar 24 is biased rearward. Thus, the chuck 18 can continue holding the work. In addition, although moment of inertia is exerted to the rotary member 90 when the rotation of the main shaft 10 is started and stopped, the frictional force produced between the internal and external threads 122, 120 prevents the rotary member 90 from being rotated relative to the draw bar 24. Thus, the chuck 18 can continue holding the work with a constant holding force.

When the work is released after the working operation is finished, the clutch 130 is switched to its connected state, again, and the servomotor 22 is started to rotate the rotary member 90 in a reverse direction, so that the draw bar 24 is moved forward. Thus, the three holding jaws 16 are moved away from one another to release the work.

In the present embodiment, since the power-driven device 20 (i.e., the state-switch device) includes, as its drive source, the servomotor 22 that is accurately controllable with respect to its rotation angle and its rotation speed, the chuck apparatus is accurately controllable with respect to its operation amount and/or its operation force. In addition, the chuck apparatus can be easily adapted to different diameters of various sorts of works and can hold the various sorts of works with respective appropriate holding forces. The latter advantages are the most significant in the case where the work has a hollow cylindrical shape and is easily deformable or the work is formed of a soft material. Moreover, since the main drive device for the main shaft 10 is provided by the electric motor 26 which is accommodated in the frame 30, the rotation of the shaft 10 can be quickly started and stopped, which contributes to improving the working efficiency of the present working lathe. Furthermore, since the clutch 130 is placed in its disconnected state while the main shaft 10 is rotated, the rotation of the shaft 10 is not transmitted to the servomotor 22, which contributes to reducing the moment of inertia produced by all the elements which are rotated with the shaft 10. In addition, the degree of freedom with respect to the position where the servomotor 22 is provided is improved. As described above, even if the clutch 130 is placed in its disconnected state while the main shaft 10 is rotated, the rear disc spring 102 biases the rotary member 90 and the draw bar 24 in the direction (in which the bar 24 is biased rearward) toward the state in which the chuck apparatus holds the work. Thus, the chuck apparatus can stably continue holding the work. As compared with the case where the power-driven device 20 employs, as its power source, a hydraulic cylinder device in place of the servomotor 22, the present chuck apparatus can enjoy a small size. In addition, since the present chuck apparatus does not need the hydraulic pressure, the chuck apparatus can enjoy a high energy efficiency.

Since the present embodiment employs the two disc springs 100, 102 as the elastic members that apply the respective elastic forces to the draw bar 24 in the opposite directions along the axial direction, respectively, the principle of the present invention is applicable to both a chuck apparatus of the above-described type which moves the draw bar 24 rearward and thereby causes the chuck 18 to hold the work, and a chuck apparatus of a different type which moves a draw bar 24 forward and thereby causes a chuck to hold a work.

Figure 2:
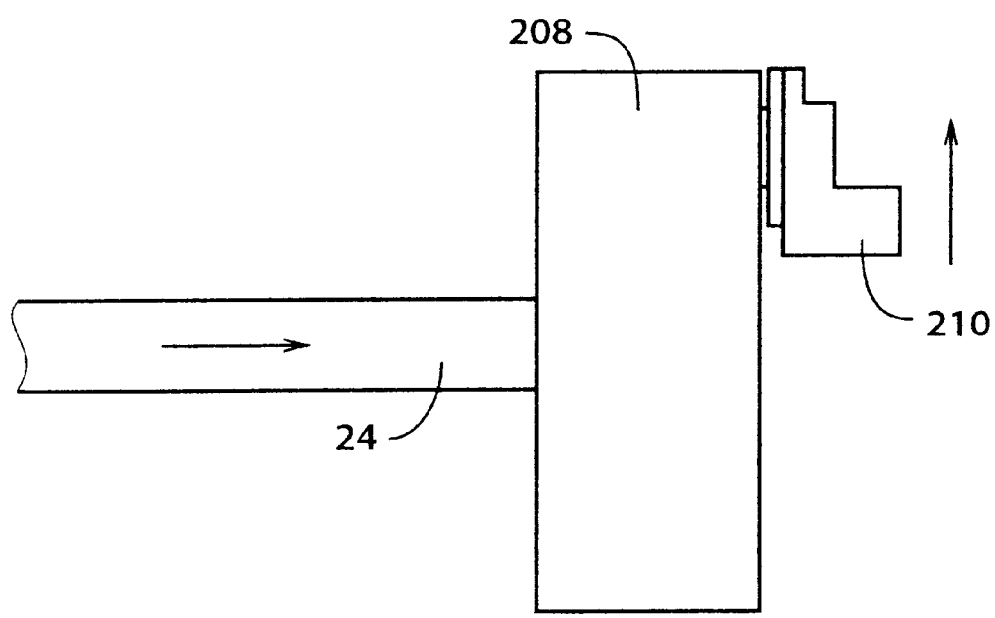
FIG. 2 is a front elevation view of a relevant portion of another chuck apparatus as a second embodiment of the present invention.

For example, the chuck 18 shown in FIG. 1 may be replaced with a chuck shown in FIG. 2. The same reference numerals as used in FIG. 1 are used to designate, and refer to, the corresponding elements and parts of the chuck shown in FIG. 2, and the description and illustration thereof are omitted. Thus, only the differences between the chuck 18 shown in FIG. 1 and the chuck shown in FIG. 2 will be described below.

As shown in FIG. 2, the present chuck apparatus includes a three-jaw chuck including a main member 208 and three holding jaws 210 (only one jaw 210 is shown in FIG. 2) each as a holding member that are supported by the main member 208 such that the three jaws 210 are equiangularly spaced from one another about the axis line of the main shaft 10 and such that the three jaws 210 are moved toward, and away from, one another while keeping an axis-symmetric relationship. Unlike the three holding jaws 16 shown in FIG. 1, the present three holding jaws 210 holds a work by engaging respective portions of an inner circumferential surface of the work. The jaws 210 are connected to the draw bar 24 via a motion converting mechanism (not shown) similar to the motion converting mechanism 26 shown in FIG. 1, so that the axial-direction linear motion of the draw bar 24 is converted by the motion converting mechanism into the axis-symmetric motions of the jaws 210 with respect to the axis line of the main member 208 (or the axis line of the main shaft 10), more specifically described, the respective radial-direction motions of the jaws 210 toward, and away from, one another. Thus, the three jaws 210 are selectively placed in a work-hold state in which the jaws 210 cooperate with one another to hold the work as an object by engaging its inner circumferential surface, and in a work-release state in which the jaws 210 releases the work. The main member 208 is detachably attached to the main shaft 10. In the second embodiment, when the chuck apparatus holds the work, first, the clutch 130 is switched to its connected state and the servomotor 22 is started, so that the rotation of the second clutch member 138 is transmitted to the rotary member 90 via the first clutch member 134. Thus, the draw bar 24 is moved forward as indicated at arrow in FIG. 2, and the three holding jaws 210 are moved away from one another to engage the inner circumferential surface of the work and thereby hold the work. After the clutch 130 is switched to its disconnected state, the electric motor 36 is started, so that the main member 208 is rotated with the main shaft 10. Though the clutch 130 is in its disconnected state, the front disc spring 100 applies the elastic force to the rotary member 90 and accordingly the draw bar 24 in the direction in which the bar 24 is moved forward. In addition, the frictional force produced between the rotary member 90 and the draw bar 24 prevents the rotary member 90 from being rotated relative to the bar 24. Thus, the three-jaw chuck can stably keep holding the work.

Thus, the two disc springs 102, 100 applies the respective elastic forces to the draw bar 24 rearward and forward, respectively. Therefore, the present invention is applicable to both the first type in which the draw bar 24 is moved rearward to place the chuck apparatus in its work-hold state, and the second type in which the draw bar 24 is moved forward to place the chuck apparatus in its work-hold state.

Each of the two disc springs 100, 102 as the elastic members may be replaced with a plurality of disc springs which are arranged in series. In addition, each disc spring 100, 102 may be replaced with a different sort of spring member or a different sort of elastic member.

The chuck apparatus shown in FIG. 1 may be modified such that the draw bar 24 is moved forward to place the chuck apparatus in its work-hold state and is moved rearward to place the apparatus in its work-release state, contrarily to the manner described above by reference to FIG. 1; and the chuck apparatus shown in FIG. 2 may be modified such that the draw bar 24 is moved rearward to place the chuck apparatus in its work-hold state and is moved forward to place the apparatus in its work-release state, contrarily to the manner described above by reference to FIG. 2.

Figure 3:
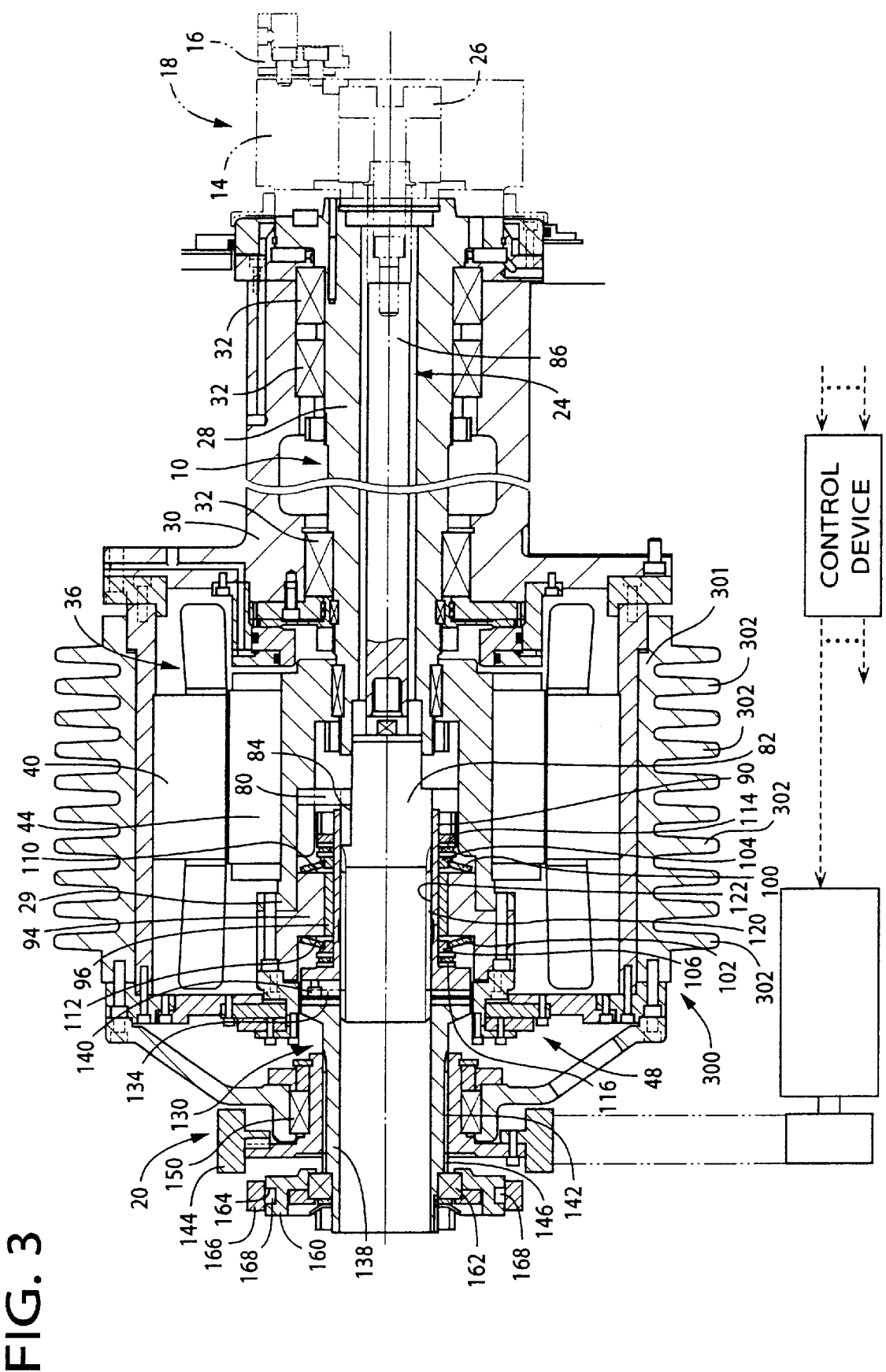
FIG. 3 is a cross-sectioned, front elevation view of a relevant portion of another working lathe including another chuck apparatus as a third embodiment of the present invention.

The liquid-using cooling device 60 for the electric motor 36, shown in FIG. 1, may be replaced with an air-using cooling device 300 shown in FIG. 3. The same reference numerals as used in FIG. 1 are used to designate, and refer to, the corresponding elements and parts of the third embodiment shown in FIG. 3, and the description and illustration thereof are omitted. The cooling device 300 includes a hollow, cylindrical member 301 which is fitted on the outer circumferential surface of the stator 40 via the rear portion of the frame 30; and a plurality of heat-radiating fins 302 which are integral with the member 301 and project from the outer circumferential surface of the same 301. The cooling device 300 is fixed to the frame 30. The fins 302 have a great surface area which radiates the heat produced by the operation of the electric motor 36.

Figure 4:
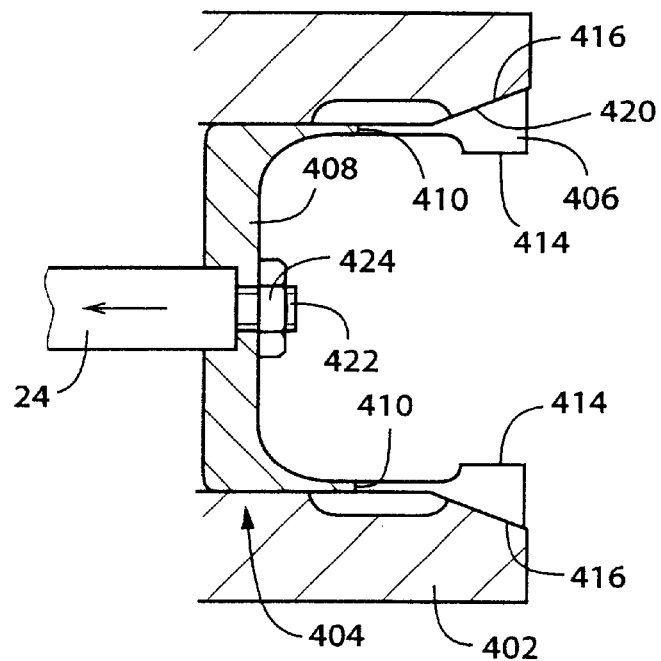
FIG. 4 is a cross-sectioned, front elevation view of a relevant portion of another chuck apparatus as a fourth embodiment of the present invention.
Figure 5:
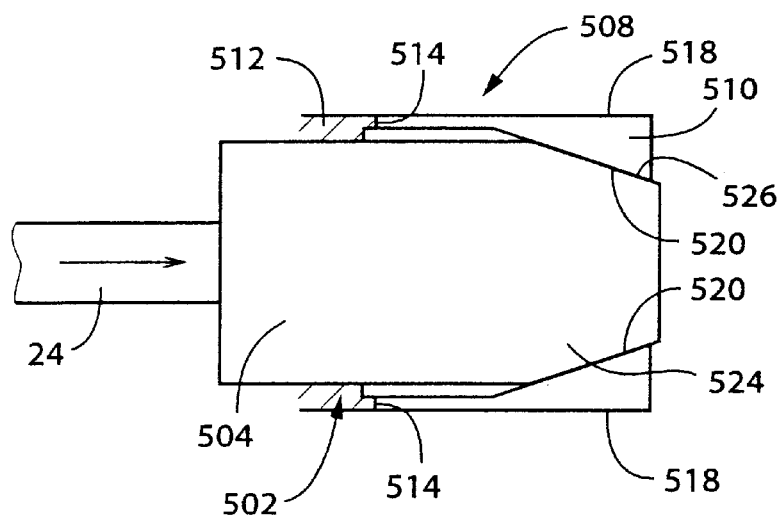
FIG. 5 is a cross-sectioned, front elevation view of a relevant portion of another chuck apparatus as a fifth embodiment of the present invention.

The present invention is applicable to various sort of chuck apparatuses other than the above-described three-jaw chuck apparatus. For example, the present invention is applicable to a collet chuck including a main member and a collet as a holding member for holding an object. The collet chuck is either an external collet chuck, as shown in FIG. 4, which externally holds an object, or an internal collet chuck, as shown in FIG. 5, which internally holds an object. In the fourth and fifth embodiments shown in FIGS. 4 and 5, the same reference numerals as used in FIG. 1 are used to designate, and refer to, the corresponding elements and parts of the fourth and fifth embodiments, and the description and illustration thereof are omitted.

The external collet chuck, shown in FIG. 4, includes a main member 402 which has a cylindrical shape and which is detachably attached to the main shaft 10; and a collet 404 which is fitted in the main member 402 such that the collet 404 is coaxial with the same 402 and is movable relative to the same 402 in the axial direction of the main shaft 10. The collet 404 has a container-like shape, and has a plurality of expanding slots 410 extending from a cylindrical end portion 406 toward a base portion 408. Thus, the inner diameter of the end portion 406 can be changed, i.e., increased and decreased. The end portion 406 has a non-tapered, cylindrical inner circumferential surface 414, and has a tapered outer circumferential surface 416 whose diameter increases toward a front opening of the end portion 406. The main member 402 has, at a front opening end thereof, a tapered inner circumferential surface 420 corresponding to the tapered outer surface 416. The collet 404 is fixed, at the base portion 408 thereof, to the draw bar 24 with an appropriate fixing means, such that the collet 404 is coaxial with the bar 24. The fixing means includes, for example, an externally threaded portion 422 formed in an end portion of the draw bar 24, and a nut 424 which is threadedly engaged with the external thread 422 to fasten to the bar 24 to the base portion 408 of the collet 404.

When the draw bar 24 is moved rearward as indicated at arrow in FIG. 4, like in the first embodiment shown in FIG. 1, the collet 404 is moved rearward, so that the tapered outer surface 416 is pressed against the tapered inner surface 420. Therefore, the diameter of the collet 404 is decreased, so that the cylindrical inner surface 414 engages an outer circumferential surface of a work as an object and holds the work. Meanwhile, when the draw bar 24 is moved forward, the collet 404 is placed in its work-release state in which the collet 404 is expanded and the diameter thereof is increased.

In the fourth embodiment shown in FIG. 4, the tapered outer surface 416 and the tapered inner surface 420 cooperate with one another to provide the first motion converting mechanism.

The internal collet chuck, shown in FIG. 5, includes a tapered member 502 as a main member that has a circular transverse cross section and includes a rear portion 504 fixed to the draw bar 24 with an appropriate fixing means such that the tapered member 502 is coaxial with the bar 24. The present collet chuck additionally includes a cylindrical collet 508 which is fitted on the tapered member 502 such that the collet 508 is coaxial with the tapered member 502. In other words, the tapered member 502 is fitted in an inner space of the collet 508 such that the tapered member 502 is movable relative to the collet 508 in the axial direction of the main shaft 10. The collet 508 has a plurality of expanding slots 514 extending from an end portion 510 toward a base portion 512. Thus, the diameter of the end portion 510 can be increased and decreased. The end portion 510 has a non-tapered, cylindrical outer circumferential surface 518, and a tapered inner circumferential surface 520 whose diameter decreases toward a front opening of the end portion 510. The tapered member 502 has, at an end portion 524 thereof, a tapered outer circumferential surface 526 corresponding to the tapered inner surface 520. The collet 508 is detachably attached, at the base portion 510 thereof, to the main shaft 10.

When the draw bar 24 is moved forward in the axial direction of the main shaft 10, as indicated at arrow in FIG. 5, the tapered member 502 is moved forward, so that the tapered outer surface 526 is pressed against the tapered inner surface 520. Therefore, the diameter of the collet 508 is increased, so that the cylindrical outer surface 518 of the collet 508 engages an inner circumferential surface of a work as an object and holds the work. Meanwhile, when the draw bar 24 is moved rearward, the collet 508 is placed in its work-release state. In the fifth embodiment shown in FIG. 5, the tapered inner surface 520 and the tapered outer surface 526 cooperate with one another to provide the first motion converting mechanism.

The collet chuck is only required to have such a construction that one of the collet and the tapered member is movable relative to the other of the collet and the tapered member in the axial direction of the main shaft 10 to hold and release the work. Therefore, in the collet chuck shown in FIG. 4, the draw bar 24 may be so modified as to be fixed to the main member 402 as the tapered member, so that the main member 402 is moved relative to the collet 404 in the axial direction; and in the collet chuck shown in FIG. 5, the draw bar 24 may be so modified as to be fixed to the collet 508, so that the collet 508 is moved relative to the tapered member 502 in the axial direction.

It is to be understood that the present invention may be embodied with various other changes, modifications and improvements, such as those described in SUMMARY OF THE INVENTION, which may occur to a person skilled in the art, without departing from the spirit and scope of the invention defined in the appended claims.

What is claimed is:

1. A chuck apparatus, comprising:
   a chuck;
   a power-driven device which selectively places the chuck in an object-hold state thereof in which the chuck holds an object, and an object-release state thereof in which the chuck releases the object, the power-driven device having, as a power source thereof, an electric motor;
   a frame; and
   a rotary shaft which is supported by the frame such that the rotary shaft is rotatable about an axis line thereof relative to the frame,
   wherein the chuck includes a main member which is attached to an end of the rotary shaft so as to be rotated with the rotary shaft, at least one holding member which is supported by the main member such that at least a portion of said one holding member is movable in a radial direction of the main member so as to be selectively placed in the object-hold state and the object-release state,
   wherein the power-driven device further comprises an axial-direction movable member which is movable in an axial direction of the chuck, a first motion converting device which converts the axial-direction motion of the movable member into the radial-direction motion of at least said portion of said one holding member, a first rotary member which is rotatable about an axis line of the axial-direction movable member and whose axial-direction movement is restricted, and a second motion converting device which converts the rotary motion of the first rotary member into the axial-direction motion of the movable member,
   wherein the power-driven device further comprises a clutch which is provided between the electric motor and the first rotary member and which is selectively placed in a connected state thereof in which the clutch connects the first rotary member and the electric motor to each other and a disconnected state thereof in which the clutch disconnects the first rotary member and the electric motor from each other, the clutch being usually kept in the disconnected state, and being placed in the connected state when the chuck is switched between the object-hold state and the object-release state,
   wherein the clutch comprises a first clutch member which is fixedly provided on the first rotary member, a second clutch member which is coaxial with the rotary shaft, is rotatable relative to the rotary shaft, and is movable relative to the rotary shaft in the axial direction of the chuck, and which is moved in said axial direction to be engaged with, and disengaged from, the first clutch member, and
   wherein the power-driven device further comprises a second rotary member which is supported by the frame such that the second rotary member is rotatable about an axis line thereof relative to the frame and which is engaged with the second clutch member such that the second rotary member is not rotatable relative to the second clutch member and is movable relative to the second clutch member in the axial direction of the chuck, and a rotation transmitting member which transmits the rotation of the electric motor to the second rotary member.

2. A chuck apparatus according to claim 1, wherein the electric motor comprises a servomotor.

3. A chuck apparatus comprising:
   a chuck;
   a power-driven device which selectively places the chuck in an object-hold state thereof in which the chuck holds an object, and an object-release state thereof in which the chuck releases the object, the power-driven device having, as a power source thereof, an electric motor,
   wherein the chuck comprises at least one holding member at least a portion of which is moved in a radial direction thereof so as to be selectively placed in the object-hold state and the object-release state, wherein the power-driven device further comprises an axial-direction movable member which is movable in an axial direction of the chuck, a first motion converting device which converts the axial-direction motion of the movable member into the radial-direction motion of at least said portion of the holding member, a rotary member which is rotatable about an axis line of the axial-direction movable member and whose axial-direction movement is restricted, and a second motion converting device which converts the rotary motion of the first rotary member into the axial-direction motion of the movable member, wherein the electric motor rotates the rotary member and thereby causes the axial-direction motion of the movable member, wherein the power-driven device further comprises at least one elastic member which applies an elastic force to the rotary member in a direction in which the chuck is biased toward the object-hold state thereof via the axial-direction movable member and the second motion converting device; and the chuck apparatus further comprising:

a first elastic member and a second elastic member which are provided on opposite sides of the rotary member, respectively, in the axial-direction of the chuck and which cooperate with each other to elastically restrict the axial-direction movement of the rotary member, wherein said at least one elastic member comprises at least one of said first elastic member and said second elastic member.

4. A chuck apparatus according to claim 1, wherein the axial-direction movable member comprises a draw bar which transmits a tensile force to the chuck and thereby places the chuck in the object-hold state.

5. A chuck apparatus, comprising:

a chuck; and a power-driven device which selectively places the chuck in an object-hold state thereof in which the chuck holds an object, and an object-release state thereof in which the chuck releases the object, the power-driven device having, as a power source thereof, an electric motor, wherein the chuck comprises at least one holding member at least a portion of which is moved in a radial direction thereof so as to be selectively placed in the object-hold state and the object-release state, wherein the power-driven device further comprises an axial-direction movable member which is movable in an axial direction of the chuck, a first motion converting device which converts the axial-direction motion of the movable member into the radial-direction motion of at least said portion of the holding member, a rotary member which is rotatable about an axis line of the axial-direction movable member and whose axial-direction movement is restrictively permitted, and a second motion converting device which converts the rotary motion of the first rotary member into the axial-direction motion of the movable member, wherein the electric motor rotates the rotary member and thereby causes the axial-direction motion of the movable member, and wherein the power-driven device further comprises at least one elastic member which is elastically deformed, when the electric motor rotates the rotary member, to permit the axial-direction movement of the rotary member, and thereby apply an elastic force to the rotary member in a direction in which the chuck is biased toward the object-hold state thereof via the second motion converting device and the axial-direction movable member.

6. A chuck apparatus according to claim 1, wherein the second motion converting device comprises a first threaded member which is substantially integral with the axial-direction movable member and a second threaded member which is threadedly engaged with the first threaded member, and wherein the second threaded member is substantially integral with the first rotary member.

7. A chuck apparatus according to claim 1, further comprising a main drive device which rotates the rotary shaft.

8. A chuck apparatus according to claim 1, wherein the power-driven device further comprises at least one elastic member which applies an elastic force to the first rotary member in a direction in which the chuck is biased toward the object-hold state via the axial-direction movable member and the second motion converting device.

9. A chuck apparatus according to claim 1, wherein the chuck comprises said one holding member and two additional holding members which are supported by the main member such that the holding members are movable in respective radial directions of the main member, and wherein the first motion converting device converts the axial-direction motion of the movable member into respective radial-direction motions of said one holding member and said two holding members that are axis-symmetric with one another with respect to an axis line of the main member.

10. A chuck apparatus according to claim 1, wherein said one holding member further comprises a collet which has a tubular shape and has a plurality of slots extending in the axial direction of the chuck, and wherein the first motion converting device includes one of an outer tapered surface and an inner tapered surface that is provided on the collet; and the other of the inner tapered surface and the outer tapered surface that is provided on the main member.

11. A chuck apparatus according to claim 7, wherein the main drive device comprises a second electric motor which is different from the electric motor of the power-driven device as a first electric motor and which includes a stator fixed to the frame; and a rotor which is provided inside the stator such that the rotor is coaxial with the stator and which is fixed to the rotary shaft so as to be rotated with the rotary shaft.

12. A chuck apparatus according to claim 1, wherein the electric motor is separate from the rotary shaft and is attached to the frame such that the electric motor is not rotatable relative to the frame.

* * * * *